(12) United States Patent
McCormick et al.

(10) Patent No.: US 7,058,354 B2
(45) Date of Patent: *Jun. 6, 2006

(54) LEARNING ACTIVITY PLATFORM AND METHOD FOR TEACHING A FOREIGN LANGUAGE OVER A NETWORK

(76) Inventors: Christopher McCormick, 37 Garden St., #9, Boston, MA (US) 02114; Scott Rule, 45 Pleasant St. #2, Swampscott, MA (US) 01709; Lincoln Davis, 6739 Springfield St., San Diego, CA (US) 92114; William Fisher, 23 Pinckney St., Boston, MA (US) 02114

( * ) Notice: Subject to any disclaimer, the term of this patent is extended or adjusted under 35 U.S.C. 154(b) by 93 days.

This patent is subject to a terminal disclaimer.

(21) Appl. No.: 10/849,457

(22) Filed: May 19, 2004

(65) Prior Publication Data

US 2004/0214153 A1 Oct. 28, 2004

Related U.S. Application Data

(63) Continuation of application No. 09/909,137, filed on Jul. 19, 2001, now Pat. No. 6,741,833.

(60) Provisional application No. 60/219,904, filed on Jul. 21, 2000.

(51) Int. Cl.
G09B 7/00 (2006.01)

(52) U.S. Cl. .............. 434/350; 434/336; 434/362; 434/156; 434/157; 434/85; 715/751

(58) Field of Classification Search ........... 434/307 R, 434/350, 336, 362, 156, 157, 85; 715/751; 709/204
See application file for complete search history.

(56) References Cited

U.S. PATENT DOCUMENTS

| | | | |
|---|---|---|---|
| 4,310,317 A | 1/1982 | Nomura et al. | |
| 4,375,080 A | 2/1983 | Barry et al. | |
| 4,538,993 A | 9/1985 | Krumholz | |
| 4,877,408 A | 10/1989 | Hartsfield | |
| 4,974,173 A * | 11/1990 | Stefik et al. | 715/751 |
| 5,010,495 A | 4/1991 | Willetts | |
| 5,263,869 A | 11/1993 | Ziv-El | |
| 5,310,349 A | 5/1994 | Daniels et al. | |

(Continued)

FOREIGN PATENT DOCUMENTS

EP 1 052 828 A2 11/2000

(Continued)

OTHER PUBLICATIONS

News releases from Englishtown.com.*

(Continued)

*Primary Examiner*—Chanda L. Harris
(74) *Attorney, Agent, or Firm*—Kirkpatrick & Lockhart Nicholson Graham LLP

(57) ABSTRACT

Described are a system and method for encouraging communication over a network between participants engaged in a learning activity. A communication channel is opened over the network between participants. An objective shared by the participants is presented. Cooperative interaction between the participants is required to complete the objective. Content related to the objective is displayed to each participant of the learning activity. Messages are exchanged in real-time between the participants over the communication channel to allow the participants to progress cooperatively towards completing the objective. Input from one of the participants of the learning activity is received. The input represents an action taken in response to the exchanged messages. The content displayed to the participants is dynamically updated based on the action taken by one of the participants during the learning activity, to depict progress towards the objective.

19 Claims, 10 Drawing Sheets

U.S. PATENT DOCUMENTS

| | | | |
|---|---|---|---|
| 5,727,950 | A | 3/1998 | Cook et al. |
| 5,810,598 | A | 9/1998 | Wakamoto |
| 5,885,083 | A | 3/1999 | Ferrell |
| 5,904,485 | A | 5/1999 | Siefert |
| 5,957,698 | A | 9/1999 | Dean et al. |
| 5,974,446 | A | 10/1999 | Sonnenreich et al. |
| 5,978,648 | A | 11/1999 | George et al. |
| 6,014,134 | A | 1/2000 | Bell et al. |
| 6,024,577 | A | 2/2000 | Wadahama et al. |
| 6,029,043 | A | 2/2000 | Ho et al. |
| 6,030,226 | A | 2/2000 | Hersh |
| 6,061,681 | A | 5/2000 | Collins |
| 6,074,213 | A | 6/2000 | Hon |
| 6,074,216 | A | 6/2000 | Cueto |
| 6,076,828 | A | 6/2000 | McGill |
| 6,141,529 | A | 10/2000 | Remschel |
| 6,146,148 | A | 11/2000 | Stuppy |
| 6,149,441 | A | 11/2000 | Pellegrino et al. |
| 6,155,840 | A | 12/2000 | Sallette |
| 6,160,987 | A | 12/2000 | Ho et al. |
| 6,164,975 | A | 12/2000 | Weingarden et al. |
| 6,190,178 | B1 | 2/2001 | Oh |
| 6,201,948 | B1 | 3/2001 | Cook et al. |
| 6,208,832 | B1 | 3/2001 | Remschel |
| 6,261,103 | B1 | 7/2001 | Stephens et al. |
| 6,270,351 | B1 | 8/2001 | Roper |
| 6,287,125 | B1 | 9/2001 | Dorcely |
| 6,301,462 | B1 | 10/2001 | Freeman et al. |
| 6,302,698 | B1 | 10/2001 | Ziv-El |
| 6,325,632 | B1 | 12/2001 | Chao et al. |
| 6,334,779 | B1 | 1/2002 | Siefert |
| 6,336,813 | B1 | 1/2002 | Siefert |
| 6,347,333 | B1 | 2/2002 | Eisendrath et al. |
| 6,358,053 | B1 | 3/2002 | Rosenfield et al. |
| 6,381,444 | B1 | 4/2002 | Aggarwal et al. |
| 6,386,883 | B1 | 5/2002 | Siefert |
| 6,411,796 | B1 | 6/2002 | Remschel |
| 6,493,690 | B1 | 12/2002 | Bertrand et al. |
| 6,505,031 | B1 | 1/2003 | Slider |
| 6,741,833 | B1 * | 5/2004 | McCormick et al. ........ 434/350 |
| 2001/0018178 | A1 | 8/2001 | Siefert |
| 2001/0039002 | A1 | 11/2001 | Delehanty |
| 2001/0055749 | A1 | 12/2001 | Siefert |
| 2002/0013836 | A1 | 1/2002 | Friedman et al. |
| 2002/0051958 | A1 | 5/2002 | Khalsa |
| 2002/0055088 | A1 | 5/2002 | Feig |
| 2002/0058234 | A1 | 5/2002 | West et al. |
| 2002/0087416 | A1 | 7/2002 | Knutson |
| 2002/0115044 | A1 | 8/2002 | Shpiro |
| 2002/0138590 | A1 | 9/2002 | Beams et al. |
| 2002/0150869 | A1 | 10/2002 | Shpiro |
| 2002/0188583 | A1 | 12/2002 | Rukavina et al. |
| 2002/0188679 | A1 | 12/2002 | Matous et al. |
| 2003/0039948 | A1 * | 2/2003 | Donahue |
| 2003/0054328 | A1 | 3/2003 | Stuppy et al. |

FOREIGN PATENT DOCUMENTS

| | | |
|---|---|---|
| WO | WO 99/32201 | 7/1999 |
| WO | WO 00/04478 | 1/2000 |
| WO | 01/22382 A1 | 3/2001 |

OTHER PUBLICATIONS

Englishtown, Inc.. Company Information: Englishtown History [online], [retrieved on Jan. 1, 2003]. Retrieved from the Internet <URL: http://www.Englishtown.com>.

Englishtown, Inc.. World's Largest Language School Launches Teacher-Led Internet School, Press Release, Jan. 18, 1999 [online], [retrieved on Dec. 10, 2002]. Retrieved from the Internet <URL: http://www.englishtown.com/master/welcome/company/pressreleases/Global/press5.asp>.

Englishtown, Inc.. Englishtown.com Introduces Free Global Voice Service, Press Release, Oct. 2, 1999 [online], [retrieved on Dec 10, 2002]. Retrieved from the Internet <URL: http:/ / www.englishtown.com/master/welcome/company/pressreleases/Global/ press12.asp>.

Englishtown, Inc.. Englishtown.com Named a Finalist in the GII Awards, Press Release, Nov. 22, 1999 [online], [retrieved on Dec. 10, 2002]. Retrieved from the Internet <URL: http:/ / www.englishtown.com/master/welcome/company/pressreleases/Global/press8.asp>.

Milton et al. "Collaborative Foreign Language Learning on the Internet for Primary Age Children: Problems and a Solution," *Education Technology & Society*, vol. 3, No. 3, Jul. 2000, pp. 286-292.

Patent Cooperation Treaty, International Search Report, International Application No. PCT/US 01/22921, mailed on Jul. 15, 2002, 6 pages.

Milton et al. "Collaborative Foreign Language Learning on the Internet for Primary Age Children: Problems and a Solution," *Education Technology & Society*, vol. 3, No. 3, Jul. 2000, pp. 286-292.

Patent Cooperation Treaty, International Search Report, International Application No. PCT/US 01/22921, mailed on Jul. 15, 2002, 6 pages.

* cited by examiner

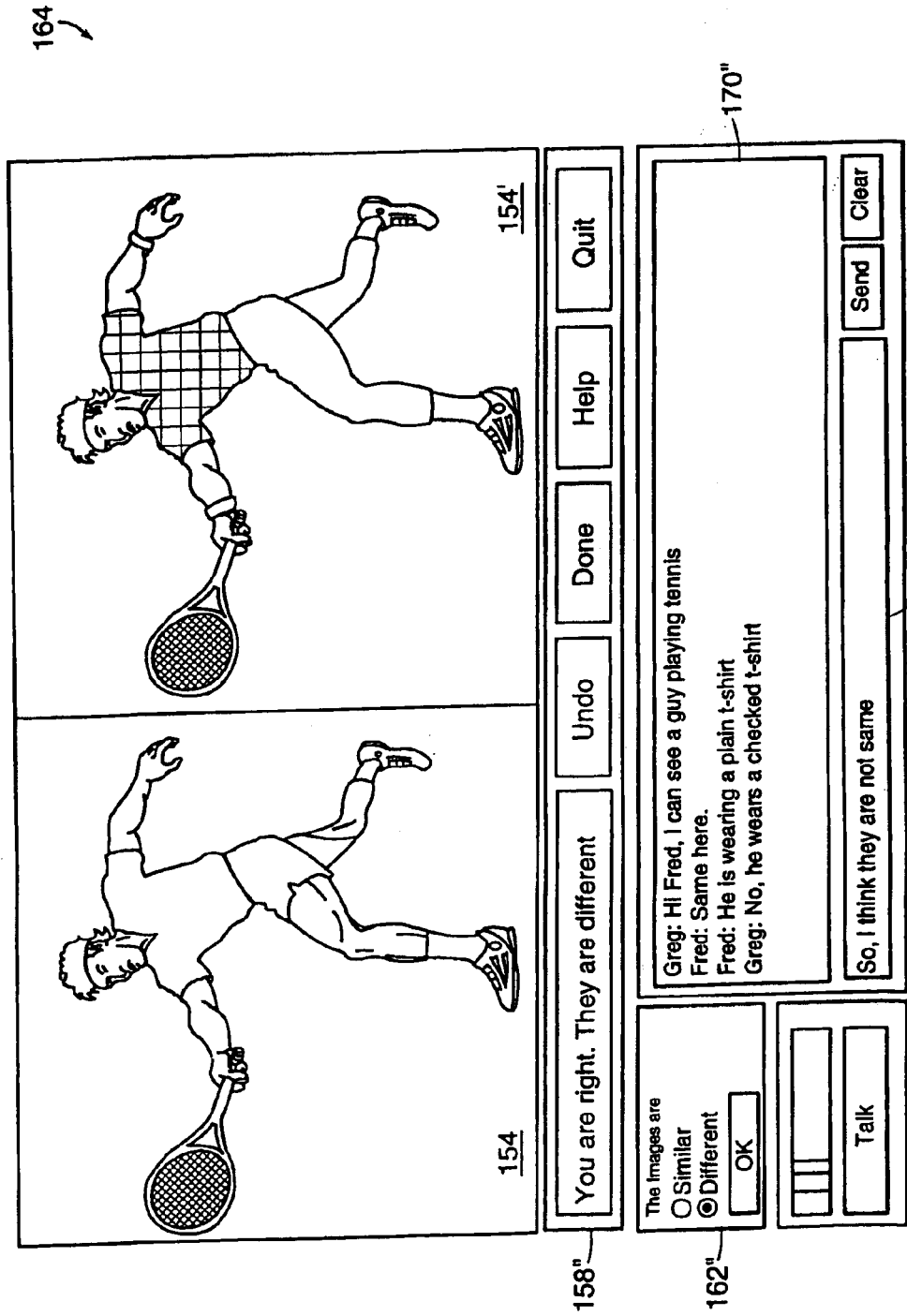

FIG. 5B

LEARNING ACTIVITY PLATFORM AND METHOD FOR TEACHING A FOREIGN LANGUAGE OVER A NETWORK

RELATED APPLICATION

This application claims priority to and the benefit of the filing date of co-pending U.S. Provisional Application, Ser. No. 60/219,904, filed Jul. 21, 2000, entitled "Learning Activity Platform," the entirety of which provisional application is incorporated by reference herein and U.S. Non-Provisional Patent Application is a continuation of 09/909,137 filed Jul. 19, 2001, now issued as U.S. Pat. No. 6,741,833 on May 22, 2004, which also claims priority to the above reference Provisional Application.

FIELD OF THE INVENTION

The invention relates generally to online educational courses. More specifically, the invention relates to a system and method for teaching foreign languages over a network.

BACKGROUND

Traditionally, the teaching of foreign languages has taken place in the school classroom where a teacher instructed students in their presence and measured their progress through written and oral examinations. With the advent of computer networking, the classroom has moved from the schools to the Internet, in particular, the World Wide Web ("Web"). Accordingly, students now can learn to speak and write in a foreign language online, i.e., over the network, by using a computer system to connect to servers and Web sites on the network that offer language-learning courses and software.

A difficulty confronting online language-learning courses, however, is that some students may not persist with self-taught instruction if left to learn the foreign language alone. Moreover, proficiency in a foreign language comes with much practice; an occasional visit to an online language course is likely to prove inadequate. Thus, a successful online language course should be able to entice students to return to the Web site to continue their language education.

Thus, there remains a need for a system and a method that encourage students to practice using a foreign language and that therefore overcome the aforementioned difficulties associated with learning a foreign language over the network.

SUMMARY OF THE INVENTION

One objective is to increase the lure of a Web site that offers interactive educational activities and holds the interest of students of foreign language. Another objective is to provide a learning activity that encourages students to learn a foreign language. Another objective is to provide a learning activity that exercises a student's oral and written proficiencies in the foreign language. Yet another objective is to provide a teaching method that does not require a moderator or a teacher, which, in effect, enables students to teach each other.

The invention features a system and method for encouraging communication over a network between participants engaged in a learning activity. In one embodiment, participants are grouped in the learning activity before the activity begins. Multimedia information related to the learning activity may be displayed to at least one of the participants while that participant waits to be grouped in the learning activity. A communication channel is opened over a network between the participants. The network can be a LAN, WAN, Intranet, the Internet, or the World Wide Web. The communication channel conveys voice and/or text communications.

The participants are presented with a shared objective. Completing the objective requires cooperative interaction between the participants over the communication channel. The participants are provided information and material sufficient to accomplish the objective.

Content related to the objective is displayed to each participant of the learning activity. In one embodiment, the content displayed to one participant differs from the content displayed to another participant. In one embodiment, the objective is for the participants to exchange messages that induce at least one of the participants to take an action that reduces a difference in the content displayed to the participants. In another embodiment, the objective is to discuss the displayed content between participants to determine if the displayed content displayed is the same for all participants. In yet another embodiment, the objective is for one participant to exchange messages with another participant that guide that other participant towards creating displayed content that is substantially similar to the content displayed to the guiding participant.

Messages are exchanged in real-time between the participants over the communication channel to allow the participants to progress cooperatively towards completing the objective. Messages exchanged over the communication channel can guide the receiving participant to take actions that lead toward completing the objective. In one embodiment, the participants exchange messages that discuss the content displayed to each participant. A sequence of the learning activity can be controlled such that the participants are induced to interact with each other to complete the objective. Providing instructions, hints, clues, or responses can facilitate interaction between the participants and thereby assist in completing the objective. Also, learning activity-specific support can be provided in a dedicated portion of a display presented to each participant. For example, a vocabulary list of words related to the learning activity can be displayed to one or more of the participants as they communicate with each other.

Input is received from one of the participants of the learning activity representing an action taken in response to the messages exchanged over the communication channel. The content displayed to the participants based on the action taken by one of the participants is dynamically updated during the learning activity to depict progress towards the objective.

In one embodiment, the learning activity is to practice using a particular language (e.g., English). Generally, the particular language is at least a second language for each of the participants. Learning activities of other embodiments can target other types of disciplines, such as mathematics, sciences, etc., and practice the principles of the invention.

The profile of each participant can be obtained, including information related to at least one of areas of interest, ability level, and topic subject matter. The objective and displayed content are geared to the profiles of participants. In one embodiment, all of the participants are students. Consequently, students are able to control their own educational development without the aid of a teacher and/or moderator.

In another aspect, the invention features a system for encouraging communication over a network between participants engaged in a learning activity. The system comprises a plurality of client systems in communication with each other client system over the network using a communication channel. A server system, in communication with the plurality of client systems, presents the users of the client systems with an objective that requires cooperative interaction between the users to complete the objective and displays content related to the objective to each client system user. The client systems exchange messages in real-time over the communication channel to enable the client system users to progress cooperatively towards completing the objective. The server system dynamically updates the content displayed to the client system users based on an action taken by one of the client system users during the learning activity to depict progress towards the objective.

In another aspect, the invention features an article of manufacture having computer-readable program means embodied thereon for encouraging communication over a network between participants engaged in a learning activity. The article comprises computer-readable program means for opening a communication channel over a network between the participants, computer-readable program means for presenting an objective shared by the participants that requires cooperative interaction between the participants to complete the objective, and computer-readable program means for displaying content related to the objective to each participant of the learning activity. The article of manufacture also comprises computer-readable program means for exchanging messages in real-time between the participants over the communication channel to allow the participants to progress cooperatively towards completing the objective, computer-readable program means for receiving input from one of the participants of the learning activity representing an action taken in response to the messages exchanged over the communication channel, and computer-readable program means for dynamically updating the content displayed to the participants based on the action taken by one of the participants during the learning activity to depict progress towards the objective.

BRIEF DESCRIPTION OF THE DRAWINGS

The invention is pointed out with particularity in the appended claims. The objectives advantages of the invention described above, as well as further objectives and advantages of the invention, may be better understood by reference to the following description taken in conjunction with the accompanying drawings, in which:

FIGS. 4A–4C are embodiments of views (or screen displays) for an exemplary selection game provided by the learning activity platform;

FIGS. 5A–5B are embodiments of views for an exemplary spatial game provided by the learning activity platform.

DESCRIPTION OF THE INVENTION

Figure 1:
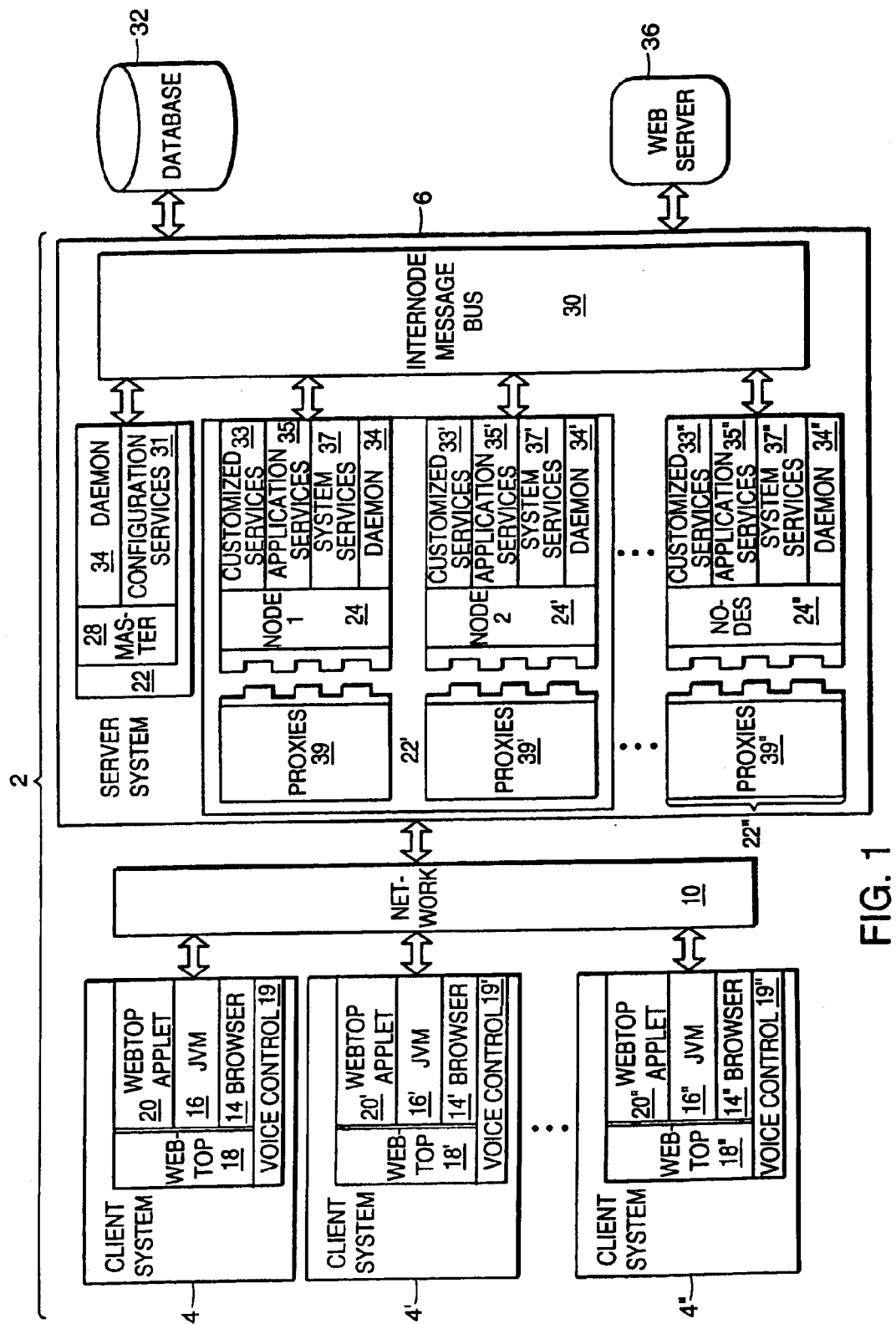
FIG. 1 is a block diagram of an embodiment of a networking system embodying a learning activity platform that provides online educational learning activities for teaching usage of foreign language in accordance with the principles of the invention.

FIG. 1 shows a networking system 2 embodying a learning activity platform that provides a plurality of online learning activities (e.g., games and cooperative assignments) that encourage prospective language students to practice the use of a foreign language in accordance with the principles of the invention. The networking system 2 includes a plurality of client systems 4, 4', and 4" (generally client 4) in communication with a server system 6 over a network 10. As described in more detail below, the learning activity platform has a client-side component that executes on the client systems 4 and a server-side component that executes on the server system 6.

In brief overview, the learning activity platform encourages students who are taking an online language course to practice their oral and written communication skills in that language by playing a variety of multi-player learning activities over the network 10. In general, the students are spread out across the non-English speaking portion of the world, and such students can use the learning activity platform to learn English as a second language.

The learning activity platform categorizes students by level of proficiency (e.g., beginner to advanced and type of English knowledge desired such as general English, Business English, Test Preparation, etc.). Each foreign language student participates in a teaching unit based upon the proficiency level of that student. A teaching unit is an instructional component of a language course and has one or more learning activities associated with it. Each multi-player learning activity provides text chat, voice chat, or both for the students of that learning activity.

The network 10 over which the client systems 4 and the server system 6 communicate can be a local area network (LAN), a wide area network (WAN), or a global network of networks such as the Internet and the World Wide Web. The client systems 4 and the server system 6 can connect to the network 10 through a variety of connections including standard telephone lines, LAN or WAN links (e.g., T1, T3, 56 kb, X.25), broadband connections (ISDN, Frame Relay, ATM), and wireless connections. Systems 4, 6 can establish connections using a variety of communication protocols (e.g., HTTP, TCP/IP, IPX, SPX, NetBIOS, Ethernet, RS232, and direct asynchronous connections).

Each client system 4 can be any processor-based device (e.g., a personal computer) capable of displaying Web documents (e.g., HTML, XML Web pages) and communicating with the server system 6 according to a protocol that transmits such Web documents. Each client system 4 includes a display screen, a keyboard, a pointing device (e.g., a mouse, trackball, touchpad, touch-screen, etc), a microphone, one or more speakers, a processor, and persistent storage (not shown). The operating system of each client system 4 can be one of a variety of windows-based platforms including but not limited to WINDOWS ®3.x, WINDOWS ®95, WINDOWS ®98, WINDOWS NT ®3.51, WINDOWS NT ®4.0, Macintosh ®, and Unix ®, DOS ®, Linux ®, and WINDOWS ® CE for windows based terminals. The operating system produces a graphical user interface through which the user of the client system 4 can interact with the display (e.g., by inputting information, clicking on objects, icons or menu items, opening and closing windows, and scrolling a displayed windows) using the keyboard or the pointing device.

The client systems 4, 4', 4" respectively include browser software 14, 14', 14", (generally browser 14) and a JVM ™ (Java Virtual Machine) 16, 16', 16" 20 (generally JVM 16).

An exemplary embodiment of the browser 14 is MICROSOFT INTERNET EXPLORER™ manufactured by Microsoft Corporation of Redmond, Wash. The browser 14 sends requests over the network 10 to retrieve a Web document or Web page from a Web server (e.g., Web server 36 described further below). The browser 14 then processes the downloaded Web page with any accompanying graphics files and applets, and displays the results on the display screen of the client system 4. The JVM 16 operates as an interpreter between Java bytecode and the operating system of the client system 4. Note that the browser 14 can have its own JVM (other than JVM 16) for running Java applets.

In accordance with the principles of the invention, a hyperlink embedded in a Web page downloaded to the client system 4 by the browser 14 links to a real-time, interactive, multi-user application program hosted by the server system 6. A client user can elect to participate in one of the learning activities provided by the learning activity platform by activating the hyperlink from the browser window.

Upon activating the hyperlink, the browser 14 downloads a Web page. Embedded in a Web page as an applet is the client-side component of the learning activity platform (referred to as a Webtop applet 20). The client side component resides in cache and runs on the client system 4. In one embodiment, the Webtop applet 20 is a JAVA™ applet (e.g., written in JavaScript™). The JVM 16 on the client system 4 interprets the Webtop applet 20. The Webtop applet 20 controls the presentation of user interface (UI) elements, the interactions with the UI elements, the communications between the client system user and the application program executing on the server system 6.

The client systems 4 can have voice communications capability (referred to as voice control 19) that enables participants in a learning activity to speak directly with each other. In one embodiment, a JAVA™ applet (e.g., written in JavaScript™) embedded in a downloaded Web page provides this voice capability. The voice capability can be downloaded in the same Web page as the Webtop applet 20. The voice control 19 can pop up on the display of the client system 4 in a different window than the browser window once the client user activates a learning activity. The HTML (Hypertext Markup Language) of the downloaded Web page and the JavaScript™ code interacts with an ActiveX™ control (i.e., plug-in) to provide the voice capabilities. In another embodiment, the voice capability is an executable program, written in Java bytecode, which accesses software installed on the user's client system 4.

One of a variety of commercially available products can achieve this voice capability, such as HearMe ® SDK (software development kit) or Roger Wilco™, both manufactured by HearMe, or Java Media Framework, manufactured by Sun Microsystems of Palo Alto, Calif. and IBM of Armonk, N.Y. These products provide voice chat capabilities in the form of reusable software components such as ActiveX™ controls, browser plug-ins, APIs (application program interface), SDKs, and DLLs (dynamic link libraries).

The server system 6, which hosts the multi-user application program, includes one or more server computing machines 22, 22', 22" (generally computing machine 22). Each computing machine 22 can host one or more nodes 24. In embodiments with more than one node 24, one of such nodes is a master node 28, and the nodes 24 communicate over an inter-node message bus 30. The master node 28 includes a configuration server 31, which operates as a storage area for persistent configuration data. The nodes 24 access the persistent configuration data upon start-up. The persistent configuration data defines which services need initializing when the learning activity platform begins execution. Each computing machine 22 that runs a node 24 runs a daemon 34, which is configured to listen to a particular IP address and port number so that native processes on the computing machine 22 running the daemon 34 can be remotely executed and administered.

Each node 24 hosts at least two types of services: application services 35 and system services 37. An application service 35 exposes service functionality to a user of a client system 4 through a client proxy 39. Most services of this type implement a collaborative action that selectively routes information between multiple client proxies 39. Examples of application services are Chat service and Lobby Service. Chat Service establishes the communication channel between the client systems 4, allowing the client system users to pass data to each other (text, voice, video data, and etc.) Lobby Service manages the activities of client system users in a game lobby, by allowing them to congregate and communicate with each other, and to launch into other applications (chat room or game rooms).

A system service 37 provides functionality to other services, but not directly to users of the client systems 4, and typically implements a component that can be part of another service. Examples of system services 37 are Registry service, Service Factory, Database Service, and AutoMatch Service. Registry service is a component which stores references to running objects and services in the server system 6—a set of running programs on the computing machines 22 that communicate with each other. Service Factory is a component that creates other system services and application services. Database Service is a component that connects to the database 32, translates client requests into database-specific commands, and executes those commands. AutoMatch Service is a component that is used to automatically group and launch client system users into a multi-user application.

Each node 24 can also provide customized services 33. For example, a Paging/Instant Messaging Service can provide one-way (paging) or two-way (instant messaging) communication between selected client system users in collaborative environment, such as lobbies. A Collaborative/Game application service allows client system users to interact and collaborate within the game environment.

In one embodiment, the internode message bus 30, configuration services 31, daemons 34, applications services 35, system services 37, and proxies 39 of the learning activity application are built on the POP.X technology framework, developed by HearMe of Mountain View, Calif.

Each client proxy 39 is a server-side component that operates as an intermediate agent between the application services 35 and the Webtop 18 of the client system 4. The client proxy 39 initializes the Webtop 18, manages media asset downloads required for a particular learning activity (with the Webtop 18), handles requests received from the Webtop 18, and with an application service 35 maintains an client user's state.

The server system 6 is in communication with a database 32 and a Web server 36. The database 32 stores learning activity-related data such as game records across game sessions, games, players, and teams. The database 32 can also store information relevant for evaluating and comparing results of the students. In one embodiment, the learning activity platform does not store the current state of an unfinished game in the database 32 because there is no notion of pausing a learning activity once in progress.

The Web server 36 supports a Web site (accessible worldwide) through which users of the client systems 4 can launch a learning activity provided by the learning activity platform. The Web site includes a plurality of Web pages that receive the users of the client systems 4 (a reception page), match users to engage them in a learning activity (a waiting session), and dismiss users upon completion of the learning activity (a farewell page). The reception Web page greets users of the client systems 4 who want to engage in a learning activity (irrespective of the learning activity type). The reception and farewell Web pages can have links to other external Web pages. Direct links to external web pages are not available, while the learning activity is in progress. If one player 40 exits the learning activity platform, such as by shutting down the browser 14, the learning activity terminates and the other player 40 (if only one other player remains in the activity) is sent to the farewell Web page. That other player 40 receives an explanation for the sudden termination of the game (e.g., "Your partner has exited the game.").

After the client system users complete the learning activity, the farewell Web page appears. In one embodiment, all learning activities lead to and all players see the same farewell Web page. The farewell Web page has link to the reception Web page to allow the client user to pair with a new partner and a new learning activity.

Figure 2:
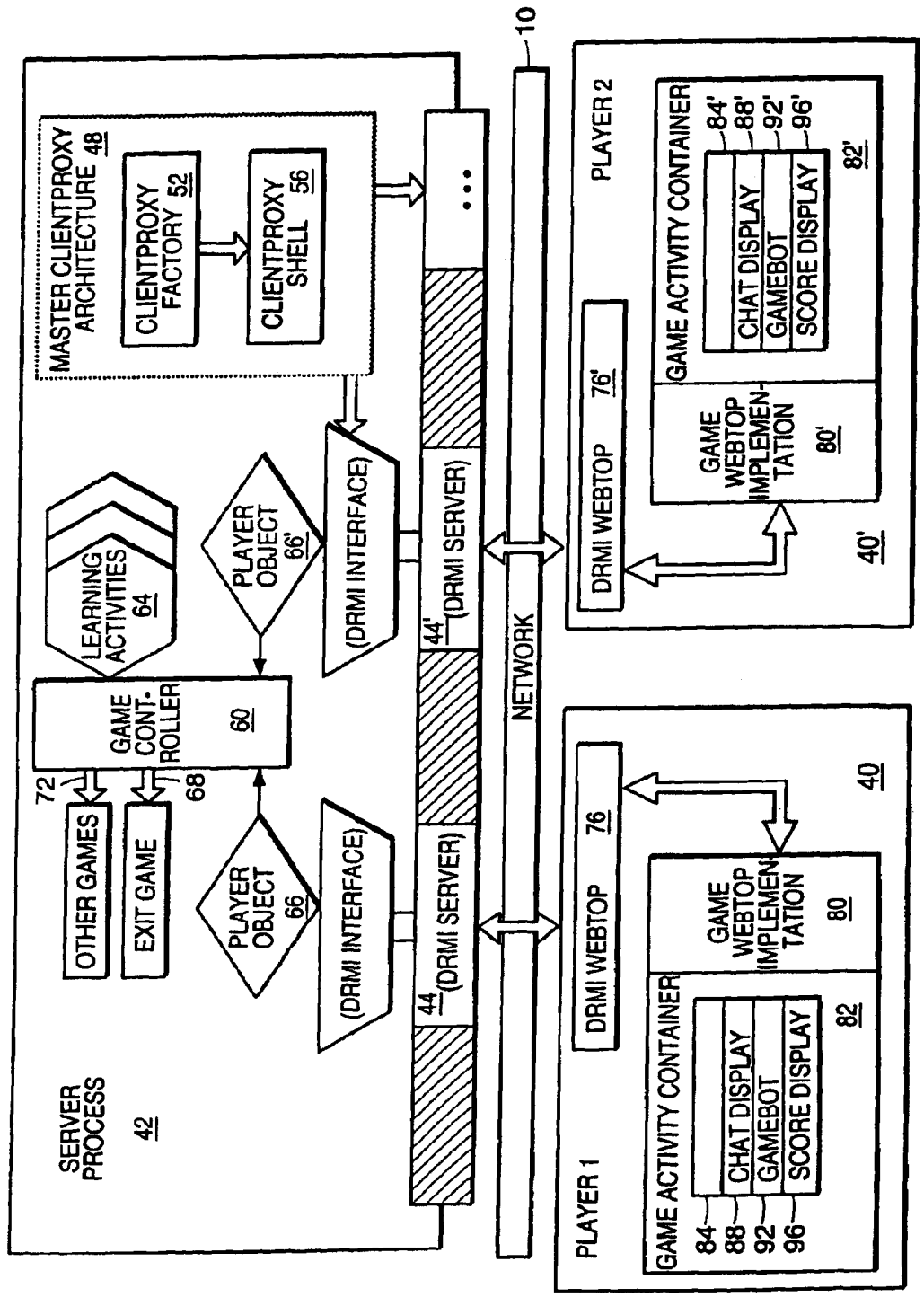
FIG. 2 is a block diagram of an embodiment of the learning activity platform.

FIG. 2 shows an embodiment of the learning activity platform including a plurality of client processes 40, 40' (hereafter generally referred to as players or participants 40) in communication with a server process 42 over the network 10. For each player 40 in communication with the server process 42 there is a DRMI (Desktop Remote Method Invocation) server 44 in communication with a DRMI interface 48. Each DRMI server 44 communicates with one of the players 40. A Master ClientProxy subsystem 48 includes a ClientProxy factory 52 and a ClientProxy shell 56. The Master ClientProxy subsystem 48 is in communication with each DRMI interface 48 and each DRMI servers 44. The Master ClientProxy subsystem creates and manages one client proxy 39 for each Webtop 18.

The Web server 36 serves an HTML page containing the Webtop applet 20. When the Webtop applet 20 loads, the Webtop 18 places a connection request to the ClientProxyFactory 52 at the port where the daemon 34 is listening. Upon receiving the request, the ClientProxyFactory 52 spawns the ClientProxyShell 56 to provide an execution thread. This thread creates a corresponding client proxy 39 to provide bidirectional interaction with the Webtop 18.

The server process 42 also includes a game controller 60, a plurality of learning activities 64, and a player object 66, 66' for each instance of a player 40, 40' that is connected to the server process 42 to play a particular game. The game controller 60 can call methods to exit (arrow 68) the selected game or to switch (arrow 72) to other games or other functions.

Each player 40, 40' includes a DRMI Webtop 76, 76' that produces a Webtop implementation object 80, 80', respectively. Each DRMI Webtop 76, 76' is an interface to the client user's Webtop 18, which a corresponding client proxy 39 calls to change the client user's display. The corresponding client proxy 39 initializes the DRMI Webtop 76, 76' and controls the interactions between the WebTop 18 and application services 35.

Each Webtop Implementation 80, 80' is class of objects that execute on the client systems 4 and communicates with the DRMI Webtop 76, 76'. Each Webtop implementation 80, 80' provides a learning activity container 82, 82' for managing a learning activity display 84, 84', a chat display 88, 88', a gamebot display 92, 92', and a score display 96, 96'. The gamebot display 92, 92' is an interactive display, that allows players 40, 40' to interact with the learning activity (i.e. drawing tools, that are used to draw pictures; or numbers of images that are dragged and placed at certain locations within the learning activity display 84', 84').

Figure 3:
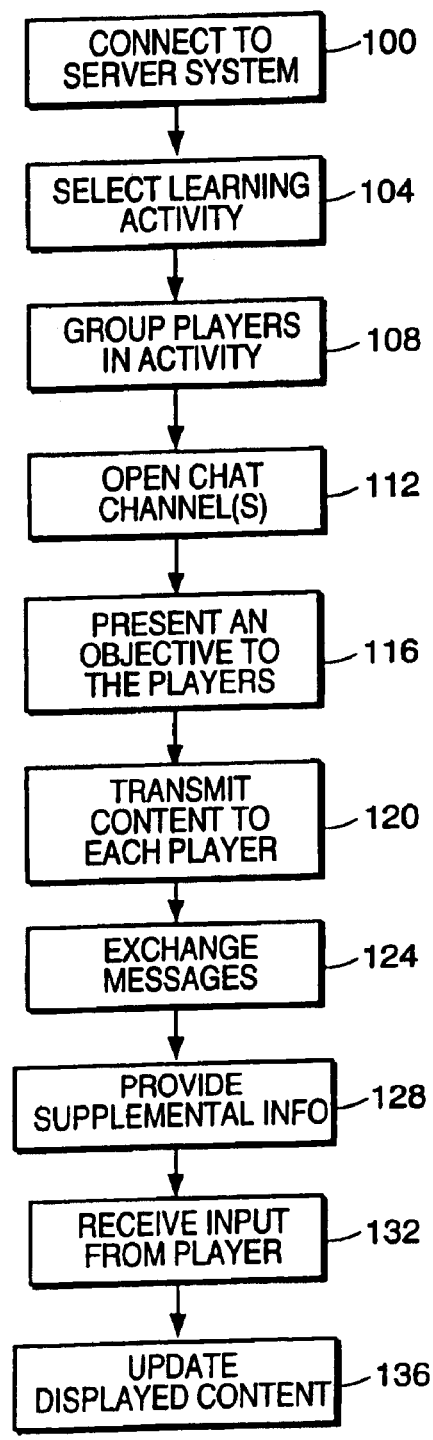
FIG. 3 is a flow diagram of an embodiment of a process for participating in a online learning activity provided by the learning activity platform.

FIG. 3 shows a flow diagram of an embodiment of a process for encouraging communication over the network 10 between players 40 engaged in a learning activity such as the usage of a foreign language. Each player 40 wanting to engage in a learning activity connects (step 100) to the server system 6. In one embodiment, players 40 are authenticated users of the Web site. Each player 40 selects (step 104) a particular learning activity. The players 40 have several activities to choose from as described below. When the player 40 chooses to play a learning activity as part of his or her curriculum, the browser 14 opens a new browser window and displays the reception Web page.

A waiting session follows the reception Web page, where the player 40 waits until the learning activity platform creates a match to another player 40. The server system 6 sends a Web page to the players 40 notifying them that they are waiting to be paired or grouped with one or more other players 40 who have also selected the same learning activity. During the waiting session, the server system 6 can display a multimedia presentation related to the learning activity to the waiting player 40 to familiarize the player 40 with vocabulary that might be useful during the upcoming activity. The server system 6 groups (step 108) the players 40 according to the selected learning activity.

After the server system 6 generates a match between a pair or among a group of players 40, the client systems 4 of the matched players open (step 112) one or more communication channels over the network 10 between each other. In one embodiment, the communication channel conveys voice communications. This voice communications channel is persistent; it remains open throughout the learning activity. In another embodiment, the communication channel conveys text data for chat communication. In still another embodiment, the players 40 open a communication channel for voice and another communication channel for text. The communication channel uses peer-to-peer implementation; the communication is routed directly from one client system 4 to the other client systems without passing through the server system 6. Communication over these channels can occur independently of the progress of the learning activity (i.e., the existence and use of the channel does not depend upon the status of the learning activity). Thus, the players 40 can engage in text and voice chat irrespective of the current game state. Players 40 can pass and receive comments at any time while playing the learning activity.

The learning activity platform presents (step 116) an objective shared by the players 40 that requires cooperative interaction between the players 40 to complete the objective. The server system 6 obtains a profile of each player 40 including information related to at least one of areas of interest, ability level, and topic subject matter, and gears the objective and displayed content to the profiles of the players 40. The particular objective depends upon the type of learning activity in which the players 40 are engaged. Each learning activity is geared towards encouraging the players 40 to practice using a particular language, such as English. Typically, the particular language is a second (i.e., foreign) language for each of the players 40, who are using the learning activity to practice the use of this foreign language.

The server system 6 transmits (step 120) content related to the objective (e.g., in the form of a Web page) to each player 40 of the learning activity. The browser 14 displays the content on the client systems to produce a view (i.e., a screen display of the particular content). The players 40 then exchange messages (step 124) in real-time over the communication channel(s) to allow the players 40 to progress cooperatively towards completing the objective. In one embodiment, the players 40 hold the discussion in a language that is foreign to at least one of them. Consequently, each player 40 exercises various skills in that foreign language.

The learning activity platform provides (step 128) the player 40 with sufficient information and materials (e.g., drawing tools, text and voice exchange capabilities) to accomplish the objective. Also, the learning activity platform facilitates interaction between the players 40 by providing guiding instructions, hints, clues, and feedback that assist in completing the objective. Activity-specific support can appear in a dedicated portion of the display presented to the players 40. An example of activity-specific support is a vocabulary list of words related to the learning activity. Help is also available to the players 40 within the learning activity. In general, the help and other guiding instructions are in the foreign language to further exercise the players' skills in that language. The server system 6 delivers the help information to the inquiring player 40 as a static HTML Web page.

The learning activity platform controls the sequence of the learning activity such that the players 40 are induced to interact with each other to complete the objective. In general, the messages exchanged by the players 40 guide one of the players 40 to provide input (step 132) that leads towards accomplishing the objective. This input corresponds to an action taken in response to the messages exchanged over the communication channel(s). The exchanged messages are typically text or voice communications that relate to the content displayed to the players 40.

The learning activity platform dynamically updates (step 136) the content displayed to the players 40 based on the action taken by one of the players 40 during the learning activity. The update depicts progress towards the shared objective.

The learning activity platform supports various learning activities that encourage the development of a second language in those who participate in the games. The learning activities are classifiable based on the behavior and objective of the game. Examples of game categories include (1) selection games, (2) spatial games, and (3) imitation games. Each game category has an objective, views, activities, component set, and scoring scheme.

Selection Games

Selection games aim at increasing the debating and interaction skills of the players 40 in the language the players 40 are learning. Each selection game includes a problem view and an answer view. With a problem view, a player 40 experiences a graphical scene, audio sequence or a video clip that bears similarity to or is different from the corresponding graphical scene, audio sequence or video clip presented to another player 40 using a different client system 4. Selection games can use a variety of images (e.g., photographs, computer-drawn graphical objects, and bitmap images), audio clips, and or video clips. The objective of each selection game is for the players 40 to discuss the displayed content to determine if the displayed or played content is the same or different for the players 40. With the answer view, the players 40 of the activity view a composite of the problem views displayed or played to each player 40. The user interfaces of the problem and answer views include image, audio clip, or video clip components, and a questionnaire component.

After each of the player 40 sees a problem view, the players 40 discuss between (or among) themselves, using text chat or voice chat or both, to arrive at a conclusion over the fact of similarity of the images, sounds or video presented to them. From the exchanged conversation, each player 40 votes whether the problem views are similar or dissimilar. After each player 40 votes by clicking the appropriate graphical button (e.g., "similar" and "different"), the learning activity platform presents the answer view to each player 40. The players 40 can then continue their conversation (text or voice) to comment upon their voting decisions. In one embodiment, a successful vote adds a predefined number of points to the voting player's score; an incorrect answer can either deduct points or leave the player's points unchanged.

Example of Selection Game

Figure 4A:
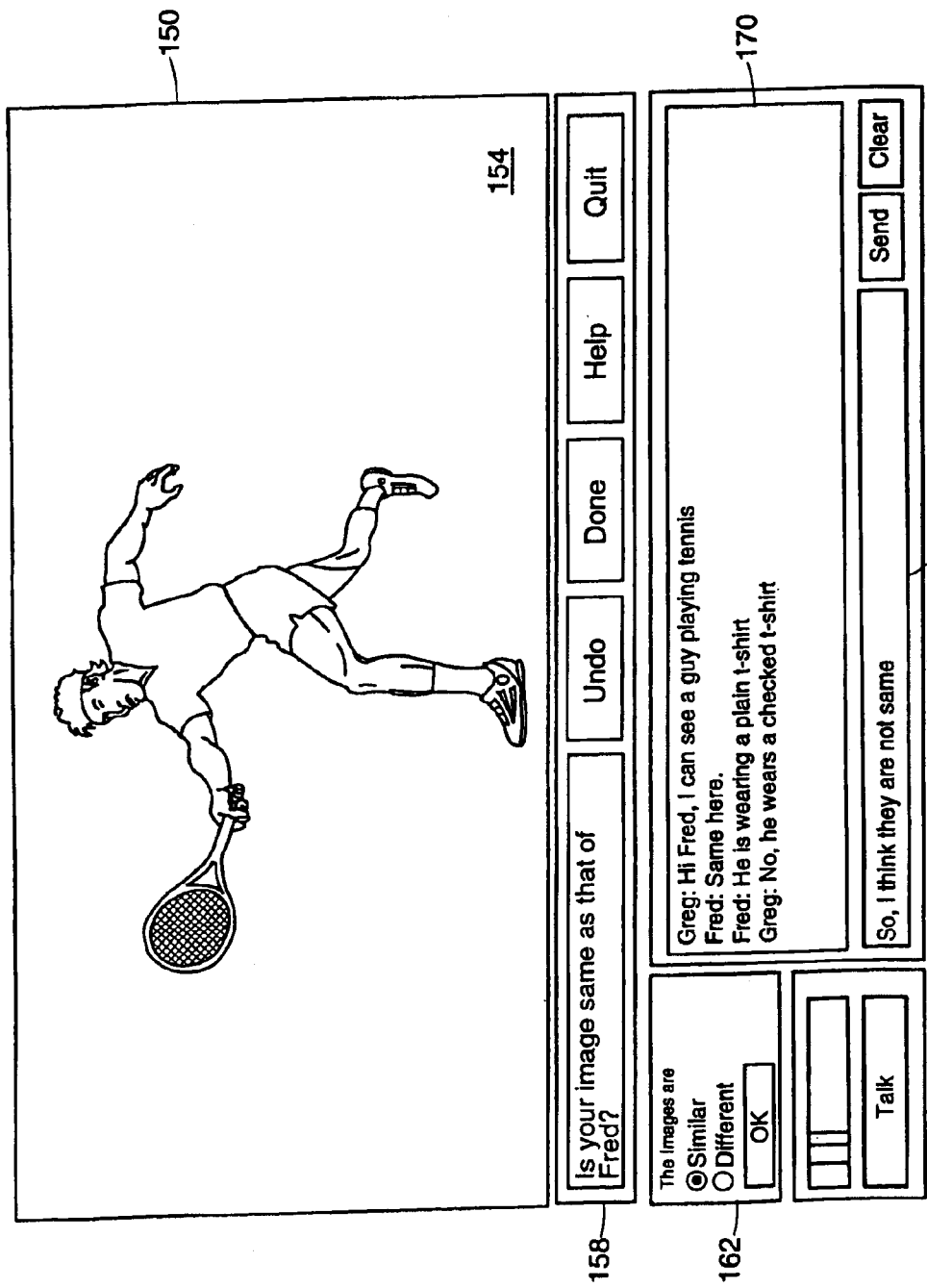
Figure 4B:
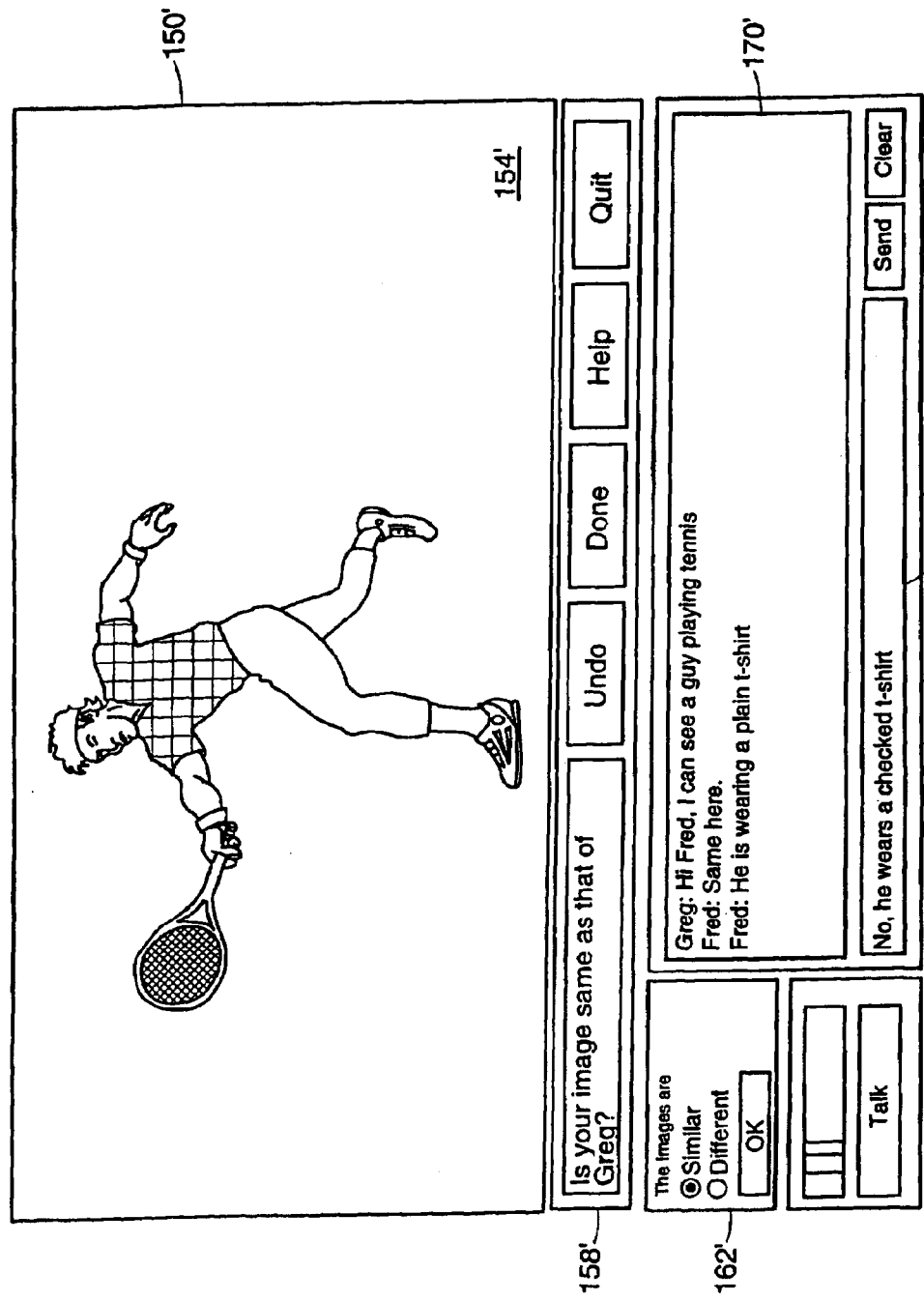

FIGS. 4A and 4B show examples of problem views 150, 150' shown to the players 40 of a selection game. The problem views 150, 150' each include an image region 154, 154', a questionnaire region 158, 158', a voting region 162, 162', a chat input region 166, 166' and a chat history region 170, 170'. In this example, the questionnaire regions 158, 158' present in question form a problem to be answered by the players 40. Here, for example, the problem is to determine if the image displayed to one player 40 in the image region 154 is the same or different than the image in the image region 154' displayed to the other player 40'. Arriving at solution to the problem requires that the players 40, 40' communicate with each other by exchanging text typed into the chat regions 166, 166' or by talking directly to the other player. In one embodiment, the communications occur in a language that is foreign to both players 40 (e.g., English). The chat history regions 170, 170' maintain a record of the textual conversation between the players 40. At any time during their conversation, the players 40 can decide to vote by entering their conclusions to the problem posed in the questionnaire regions 158, 158' in their respective voting regions 162, 162'.

FIG. 4C shows an example of an answer view 164 that combines to the image regions 154, 154' into a single view so that each player 40, 40' can visually compare the image regions 154, 154' and determine if each had voted correctly. Each player 40, 40' sees an answer view 164, which can have the same or different appearance to the players 40, 40', depending upon how the players 40, 40' voted. Consider, for example, that player 40 concludes that the images 154, 154' are different, whereas the player 40' concludes that the images 154, 154' are the same. The questionnaire region 158" of the answer view 162 presented to player 40 can indicate that player 40 was correct, whereas the questionnaire region 158" of the answer view 162 presented to player 40' can indicate that player 40' was incorrect.

After the players 40, 40' see the answer view 164, they can continue to communicate each other to discuss the outcome of their votes using text and voice chat. The players 40, 40' enter text input into the chat input region 166". A chat history region 170" maintains a record of the text conversation between the players 40, 40".

Spatial Games

Spatial games aim to teach players 40 how to issue and understand instructions and to increase the players' abilities to form sentences or phrases. Each spatial game has a problem view and an answer view. One player sees the problem view and the other player sees the answer view. In general, the problem view has a collection of objects that are available in a container and an assembling area where the objects can be assembled or fit into their intended positions. The player 40 shown the problem view sees the answer view after either solving the problem or deliberately terminating the game short of discovering the solution. The answer view shows a correct arrangement or assembly of the same set of components presented in the problem view.

Players 40 play spatial games in one of two modes: (1) in a pilot mode, or (2) in a yield mode. In the pilot mode, one player 40 instructs another player 40' to move an object from the container to the assembling area, and the other player 40' listens to and follows such instructions as understood by that player 40'. After the second player 40' completes the move, the view of the first player 40 is updated to show the move of the second player 40'. After the second player 40' arranges or organizes all objects properly in their intended positions in the assembling area, or enough objects for their satisfaction, the players 40, 40' exchange roles and continue the game. In the yield mode, the players 40, 40' exchange roles after each move of the game. Making a correct move adds a predetermined number of points to the player's score. An incorrect move can leave the score unchanged or cause the score to decrease.

Figure 5A:
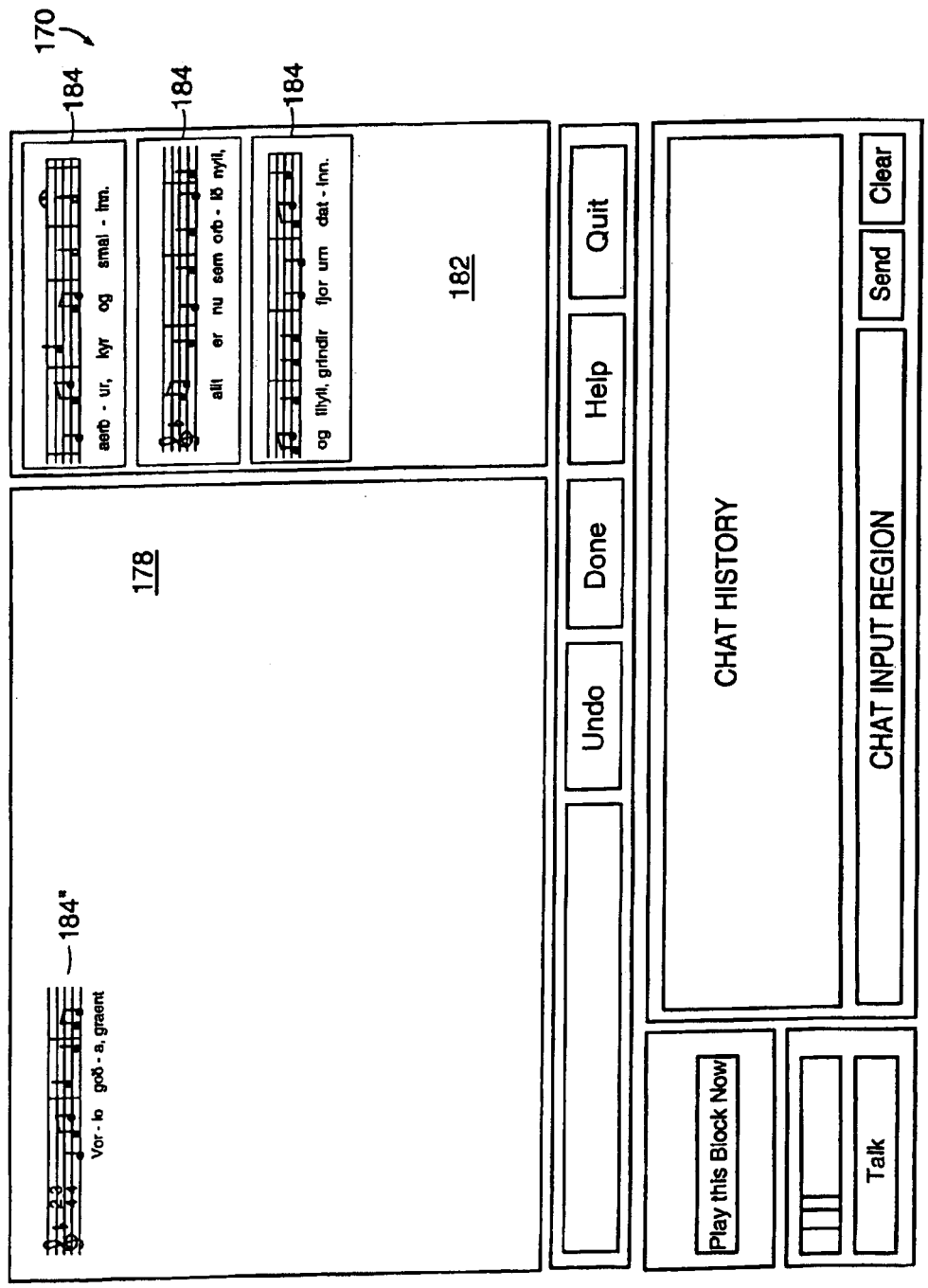
Figure 5B:
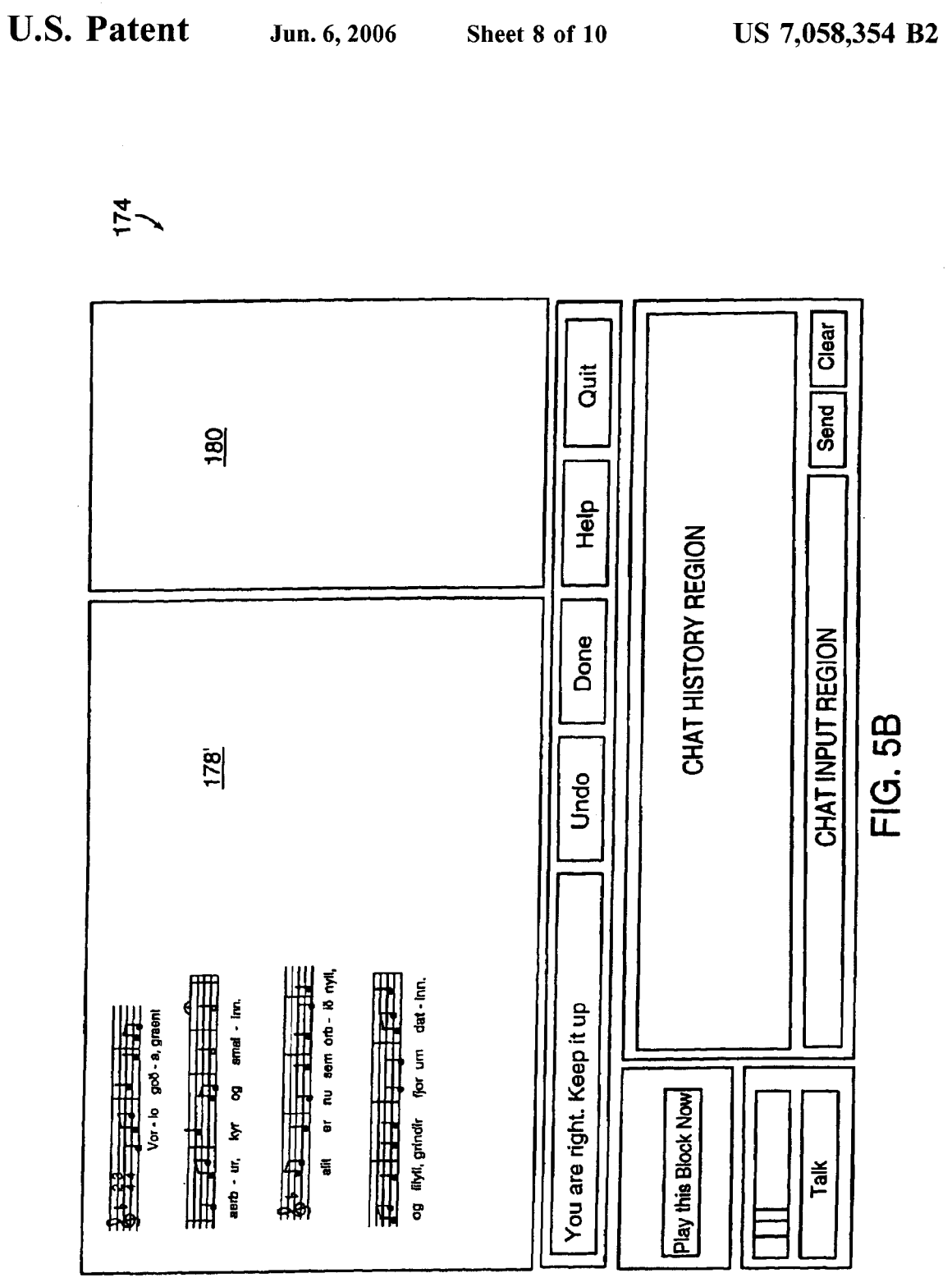

FIGS. 5A and 5B show examples of a problem view 170 and an answer view 174 respectively for an exemplary spatial game. FIG. 5A includes an assembly area 178 and an object container 182. Here, each object 184 in the object container 182 is a series of musical notes. As shown, the player 40 viewing the problem view 170 has dragged and dropped one series of notes 184 into the assembly area 178.

FIG. 5B includes an assembly area 178' that contains the objects 184 assembled in their proper arrangement. The player 40' presented with the answer view 174 tells the player 40' with the problem view 170 how to move the objects 184 from the object container 182 into the assembly area 178 using verbal or written instructions or both in a foreign language. Attempts (i.e., moves or actions) by the player 40 with the problem view 170 to follow the instructions of the player 40' with the answer view 174 appear in the blank region 182' in the answer view 174. From what appears in this region 182', the player 40' can determine whether player 40' is correctly following the provided instructions, and can offer instructions to correct any errors or confirm any correct moves.

Imitation Games

Imitation games aim to teach players 40 how to issue and understand instructions and to expand their vocabulary. In one embodiment, the imitation games expand the players' vocabulary with respect to geometrical figures and basic shapes. Each imitation game has a leader view and a follower view. The leader view includes two canvases. One canvas shows geometrical figures, and the other canvas shows an initially blank empty surface. The follower view initially has a blank empty canvas adjacent to a drawing tool kit. Drawing tools provided by a drawing tool kit include lines, ellipses, rectangle, text, and free-hand lines. Other embodiments of the tool kit include line-thickness control and color features.

During an imitation game, one player 40 is the leader and the another player 40' is the follower. (The leader sees the leader view and the follower sees the follower view.) The leader instructs the follower, using text chat or voice chat or both, what figures or shapes to draw in the blank, empty canvas. The follower selects a drawing tool from the tool kit, and draws an image in the blank canvas region according to what the follower understands to be the instructions from the leader. The same drawing appears in the second blank canvas of the leader view. The leader and follower can then discuss between themselves the figure(s) drawn by the follower. After the players 40 decide that the follower drew a proper image, or the leader or follower concedes the attempt to reproduce the image, the leader and follower can exchange roles. A scoring scheme can reward correct reproductions of the image.

Figure 6A:
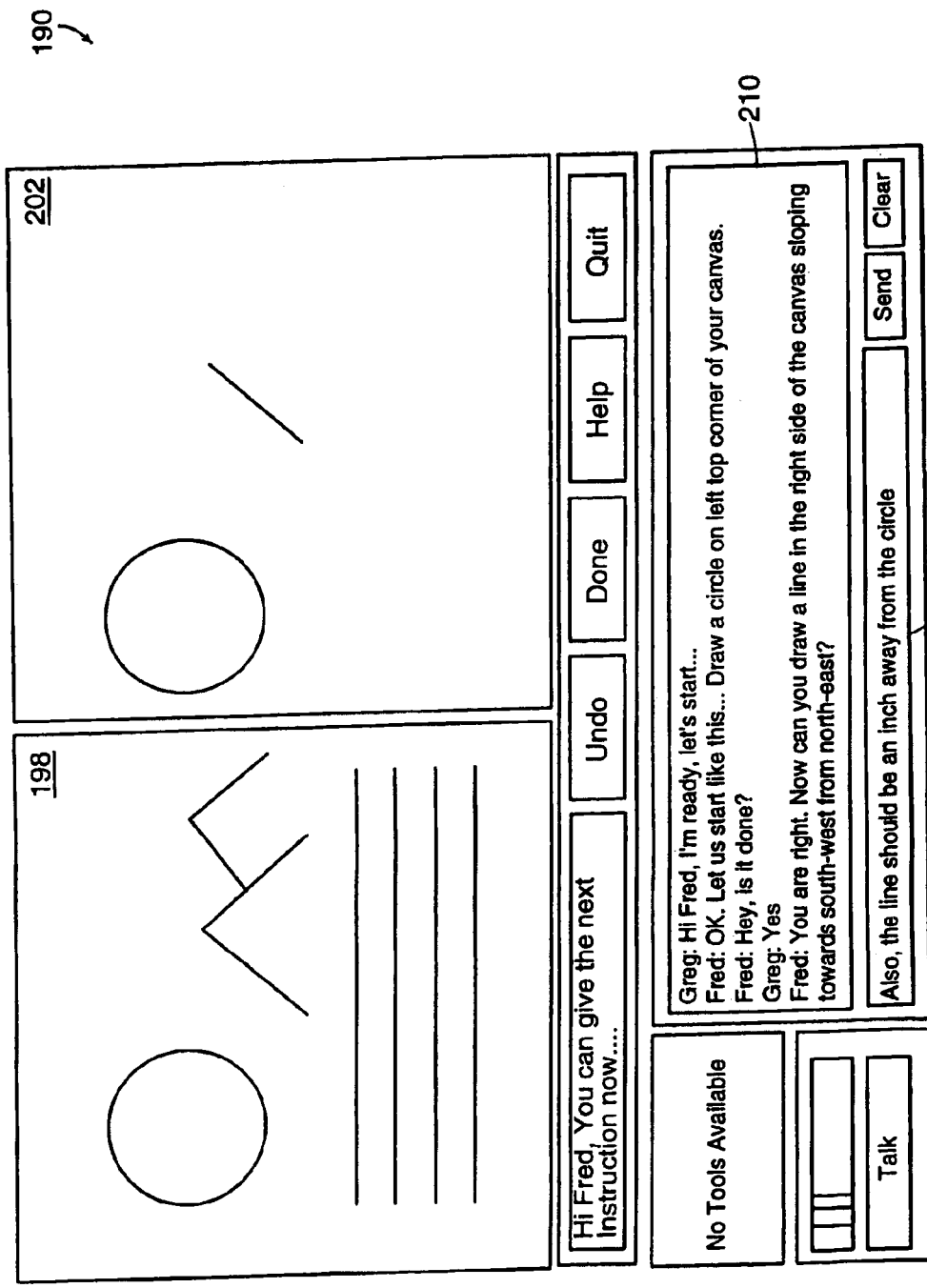
FIGS. 6A–6B are embodiments of views for an exemplary imitation game provided by the learning activity platform.
Figure 6B:
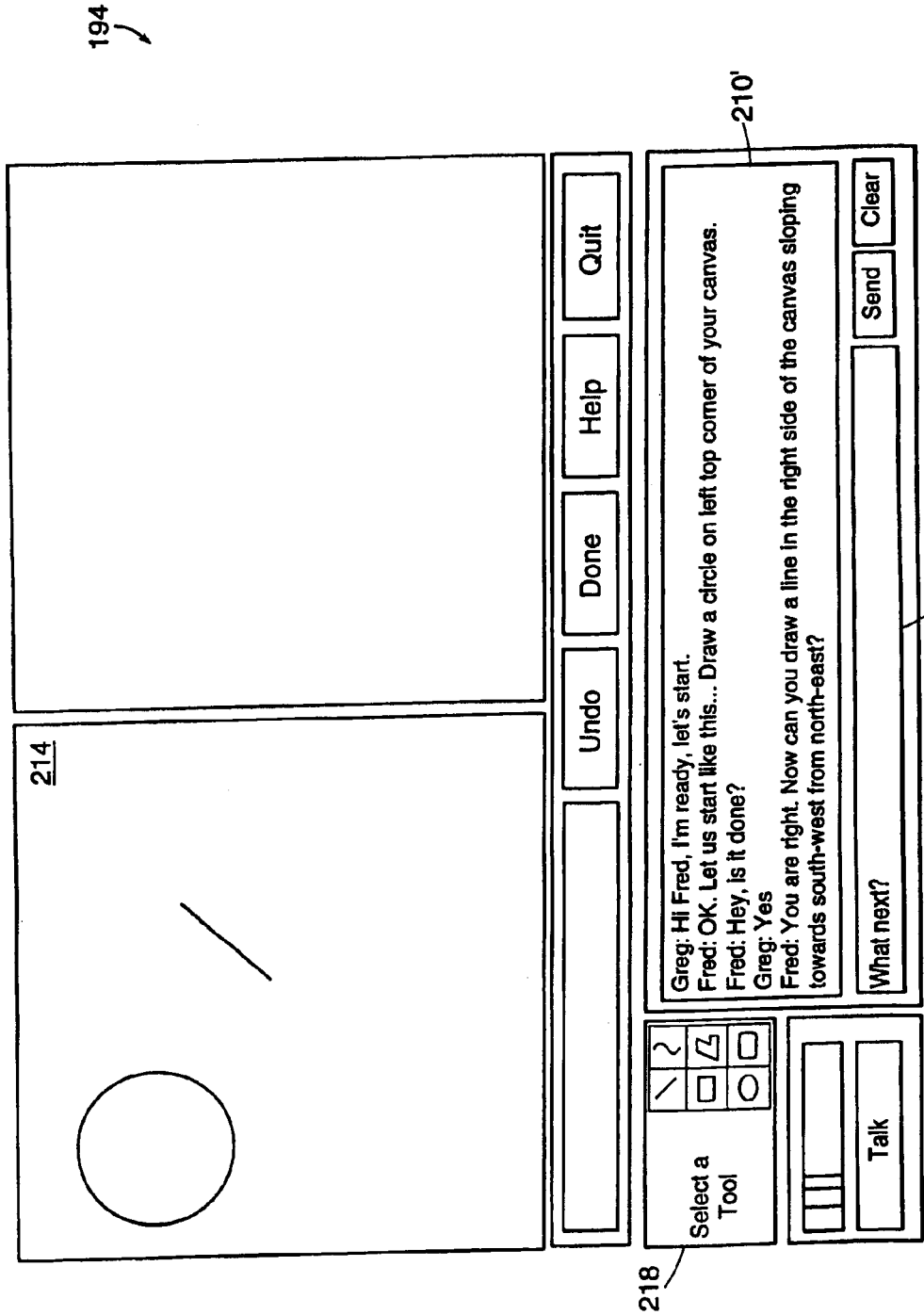

FIGS. 6A and 6B show examples of a leader view 190 and a follower view 194, respectively, for an exemplary imitation game. The leader view 190 includes an answer region 198 that shows the final image that the leader is attempting to instruct the follower to generate and a follower region 202 that displays the current image as produced by the follower. The leader view 190 also includes a chat-input region 206 and a chat history region 210.

The follower view 194 includes a drawing region 214 and a drawing tool kit 218, a chat input region 206' and a chat history region 210'. The objective of the imitation game is for the players 40 to exchange messages in a foreign language that guide the follower towards creating displayed content that is substantially similar to the content displayed to the leader.

Other types of games can execute on the learning activity platform in accordance with the principles of the invention. For example, the players 40 can communicate in a foreign language over the network to cooperate towards solving other types of problems, such as solving math calculations, crossword puzzles, and word games, giving directions on a map, drawing and coloring images, etc.

The learning activity platform supports the addition of new games. Adding games to the learning activity platform involves configuration files, called an activity description file (ADF) and a resource definition file (RDF). With the ADF and RDF, game developers can add games of a particular game category with different assets or different types of assets or different properties, remove games, and modify properties of existing games.

The ADF file bears similarity to a WINDOWS™ setup file (.ini file). The ADF file includes a set of named sections: a general section and a game section. Each section includes one or more line items and begins with the name of the section enclosed in square brackets. Each section serves a particular purpose, such as to provide information about the ADF file itself or to provide information about a game. Each of the line items in a section is in the form of key=value format.

The general section is the first section in an ADF file. The general section is the same for each type of learning activity (or game) and contains general information about the file and the layout of the file. The general section includes the following entries: (1) a type entry, (2) an asset reference entry, (3) a games entry, and (4) a version entry.

The type entry identifies the category of the learning activities in the ADF file. The ADF file hosts one type of learning activity. The asset reference entry identifies the RDF referred to by the learning activities in the ADF file. In this embodiment, the ADF refers to one RDF only. The version entry indicates the version of the ADF. The games entry identifies the games sections included in the ADF file.

Commas separate the names of the game sections. There can be more than one game section in an ADF file, but each game section represents one type or category of learning activity.

The game section(s) provides the details of the learning activities, such as a caption of the learning activity, player level, and other activity-specific details. The type of learning activity identified in the general section of the ADF file determines the entries of a game section. Typically, the game section provides information on the assets used by the game in different views. For example, a section used to represent a selection game can have the following entries:

| Name: | Name of the game |
|---|---|
| Level: | Level of the player |
| View1 Assets: | Assets required for Problem view of Player 1 |
| View2 Assets: | Assets required for Problem view of Player 2 |
| View3 Assets: | Assets required for Answer view |
| Help: | URL (Universal Resource Locator) of Help page |
| IncScore: | Positive Points for a correct move |
| DecScore: | Negative Points for an incorrect move |
| MaxTime: | Maximum time allowed for a game |

The RDF includes information about the assets used by the learning activities in the ADF. In one embodiment, the RDF includes a general section, one or more resource sections (e.g., a text resource section, an image resource section, an audio resource section, and a video resource section). In one embodiment, the general section occurs first in the RDF, and appears the same for all versions of the RDF. The general section provides information about the RDF and the layout of the RDF using a name entry and a version entry. The name entry identifies the repository of the RDF, and the version entry identifies the version of the RDF.

Each resources section provides the properties of that resource, and the entries within the resource section depend upon the type of resource. For example, an audio resource has an entry that represents the background image to display, which, when clicked upon, causes the audio resource to be played. In one embodiment, the learning activity platform supports four types of resources: text, image audio, and video.

An embodiment of a text resource section includes:

| Resource ID | |
|---|---|
| Type = Text: | Type of resource is text |
| String: | Text to be displayed |
| Bold: | Is it bold? True/False |
| Italic: | Is it italic? True/False |
| Underline: | Is it underline? True/False |
| Color: | Text color value, a predefined constant such as 'RED' or 'BLUE' |
| BGColor: | Background color, a predefined constant such as 'RED' or 'BLUE' |
| IdealPt: | Preferred location of the resource in the screen |
| Moveable: | Is the text region moveable? True/False |

An embodiment of an image resource section includes:

| Resource ID | |
|---|---|
| Type = Picture: | Type of resource is image |
| URL: | URL of the image |
| InitPt: | Initial location of the image in the problem view |
| IdealPt: | Preferred location of the image |
| Moveable: | Is the image moveable? (problem view, answer view) |
| Hidden: | Is the Image visible? (problem view, answer view) |

An embodiment of an audio resource section includes:

| Resource ID | |
|---|---|
| Type = Audio: | Type of resource is audio clip |
| URL: | URL of the audio clip |
| OnClickOf: | Associated image section name; Play audio on clicking this image |
| Playable: | Can the audio be played (problem view, answer view) |

An embodiment of a video resource section includes:

| Resource ID | |
|---|---|
| Type = Video: | Type of resource is video clip |
| URL: | URL of the video clip |
| Playable: | Can the video be played (problem view, answer view) |
| InitPt: | Initial location of the image in the problem view |
| IdealPt: | Preferred location of the image |
| Moveable: | Is the image moveable? (problem view, answer view) |

The present invention may be implemented as one or more computer-readable software programs embodied on or in one or more articles of manufacture. The article of manufacture can be, for example, any one or combination of a floppy disk, a hard disk, hard-disk drive, a CD-ROM, a DVD-ROM, a flash memory card, an BEROM, an EPROM, a PROM, a RAM, a ROM, or a magnetic tape. In general, any standard or proprietary, programming or interpretive language can be used to produce the computer-readable software programs. Examples of such languages include C, C++, Pascal, JAVA ™, BASIC, Visual Basic ® and Visual C++®. The software programs may be stored on or in one or more articles of manufacture as source code, object code, interpretive code, or executable code.

While the invention has been shown and described with reference to specific preferred embodiments, it should be understood by those skilled in the art that various changes in form and detail may be made therein without departing from the spirit and scope of the invention as defined by the following claims.

What is claimed is:

1. A method of communicating during a learning activity, the method comprising:
   providing a first content to a first participant of a learning activity;
   providing a second content to a second participant of the learning activity;
   receiving at least one message transmitted via a network from the first participant, the at least one message inducing the second participant to reduce a difference between the first and second content; and updating the first and second content based on an action by the second participant made in response to the at least one message.

2. The method of claim 1, further comprising:

displaying the updated first content to the first participant; and displaying the updated second content to the second participant.

3. The method of claim 1, further comprising:

providing an objective to be shared by the first and second participants, the objective requiring cooperative interaction between the first and second participants in achieving the objective, wherein the at least one message, at least partly, represents such cooperative interaction.

4. The method of claim 3, wherein the updated first and second content represent a progression towards achieving the objective.

5. The method of claim 3, wherein the cooperative interaction between the first and second participants occurs in substantially real time.

6. The method of claim 3, wherein the first and second content are associated with a game and the shared objective corresponds to completing the game.

7. The method of claim 6, further comprising:

by the first and second participants, cooperatively interacting to identify when the difference between the first and second content is no longer present.

8. The method of claim 7, wherein the cooperative interaction between the first and second participants encourages such participants to practice a language that is foreign to at least one of the participants.

9. The method of claim 6, further comprising:

by the second participant, cooperatively interacting with the first participant to replicate the first content in the second content.

10. The method of claim 9, wherein the cooperative interaction encourages the second participant to practice a foreign language.

11. The method of claim 6, further comprising:

by the first and second participants, cooperatively interacting to solve a problem.

12. The method of claim 11, wherein the cooperative interaction between the first and second participants encourages such participants to practice a language that is foreign to at least one of the participants.

13. The method of claim 1, wherein the learning activity encourages at least one of the first and second participants to practice a foreign language.

14. The method of claim 1, further comprising:

grouping at least the first and second participants in the learning activity.

15. The method of claim 14, further comprising:

displaying multimedia information associated with the learning activity to at least one of the first and second participants while such participants await to be grouped in the learning activity.

16. The method of claim 1, further comprising:

facilitating interaction between the first and second participants by providing guiding information associated with the learning activity.

17. The method of claim 1, further comprising:

accessing a profile associated with at least one of the first and second participants, wherein the profile includes information associated with at least one of an area of interest, an ability level, and a topic.

18. The method of claim 17, further comprising:

based on the profile, grouping the first and second participants in the learning activity.

19. The method of claim 17, further comprising:

determining the first and second content, based on the profile.

* * * * *

(12) EX PARTE REEXAMINATION CERTIFICATE (15th)
Ex Parte Reexamination Ordered under 35 U.S.C. 257

United States Patent
McCormick et al.

(10) Number: US 7,058,354 C1
(45) Certificate Issued: *Oct. 27, 2014

(54) LEARNING ACTIVITY PLATFORM AND METHOD FOR TEACHING A FOREIGN LANGUAGE OVER A NETWORK

(75) Inventors: Christopher McCormick, Boston, MA (US); Scott Rule, Swampscott, MA (US); Lincoln Davis, San Diego, CA (US); William Fisher, Boston, MA (US)

(73) Assignee: Englishtown, Inc., Cambridge, MA (US)

Reexamination Request:
No. 96/000,016, Apr. 9, 2013

Reexamination Certificate for:
Patent No.: 7,058,354
Issued: Jun. 6, 2006
Appl. No.: 10/849,457
Filed: May 19, 2004

(*) Notice: This patent is subject to a terminal disclaimer.

Related U.S. Application Data

(63) Continuation of application No. 09/909,137, filed on Jul. 19, 2001, now Pat. No. 6,741,833.

(60) Provisional application No. 60/219,904, filed on Jul. 21, 2000.

(51) Int. Cl.
*G09B 7/00* (2006.01)

(52) U.S. Cl.
USPC .......... 434/350; 434/156; 434/157; 434/336; 434/362; 434/85; 715/751

(58) Field of Classification Search
None
See application file for complete search history.

(56) References Cited

To view the complete listing of prior art documents cited during the proceeding for Reexamination Control Number 96/000,016, please refer to the USPTO's public Patent Application Information Retrieval (PAIR) system under the Display References tab.

*Primary Examiner* — Cameron Saadat

(57) ABSTRACT

Described are a system and method for encouraging communication over a network between participants engaged in a learning activity. A communication channel is opened over the network between participants. An objective shared by the participants is presented. Cooperative interaction between the participants is required to complete the objective. Content related to the objective is displayed to each participant of the learning activity. Messages are exchanged in real-time between the participants over the communication channel to allow the participants to progress cooperatively towards completing the objective. Input from one of the participants of the learning activity is received. The input represents an action taken in response to the exchanged messages. The content displayed to the participants is dynamically updated based on the action taken by one of the participants during the learning activity, to depict progress towards the objective.

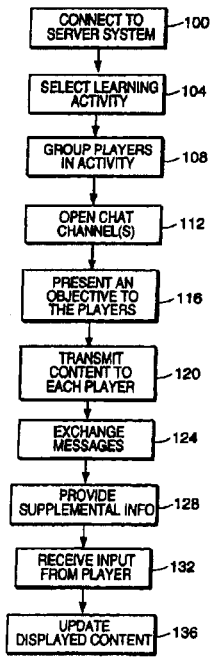

EX PARTE REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1-19 is confirmed.

* * * * *

US007058354C2

(12) EX PARTE REEXAMINATION CERTIFICATE (10869th)
United States Patent
McCormick et al.

(10) Number: US 7,058,354 C2
(45) Certificate Issued: *May 18, 2016

(54) LEARNING ACTIVITY PLATFORM AND METHOD FOR TEACHING A FOREIGN LANGUAGE OVER A NETWORK

(75) Inventors: Christopher McCormick, Boston, MA (US); Scott Rule, Swampscott, MA (US); Lincoln Davis, San Diego, CA (US); William Fisher, Boston, MA (US)

(73) Assignee: ENGLISHTOWN, INC., Cambridge, MA (US)

Reexamination Request:
No. 90/013,142, Jan. 31, 2014

Reexamination Certificate for:
Patent No.: 7,058,354
Issued: Jun. 6, 2006
Appl. No.: 10/849,457
Filed: May 19, 2004

Reexamination Certificate C1 7,058,354 issued Oct. 27, 2014

(*) Notice: This patent is subject to a terminal disclaimer.

Related U.S. Application Data

(63) Continuation of application No. 09/909,137, filed on Jul. 19, 2001, now Pat. No. 6,741,833.

(60) Provisional application No. 60/219,904, filed on Jul. 21, 2000.

(51) Int. Cl.
*G09B 7/00* (2006.01)
*G09B 7/02* (2006.01)
*G09B 19/06* (2006.01)

(52) U.S. Cl.
CPC . *G09B 7/02* (2013.01); *G09B 19/06* (2013.01)

(58) Field of Classification Search
None
See application file for complete search history.

(56) References Cited

To view the complete listing of prior art documents cited during the proceeding for Reexamination Control Number 90/013,142, please refer to the USPTO's public Patent Application Information Retrieval (PAIR) system under the Display References tab.

*Primary Examiner* — Cameron Saadat

(57) ABSTRACT

Described are a system and method for encouraging communication over a network between participants engaged in a learning activity. A communication channel is opened over the network between participants. An objective shared by the participants is presented. Cooperative interactive between the participants is required to complete the objective. Content related to the objective is displayed to each participant of the learning activity. Messages are exchanged in real-time between the participants over the communication channel to allow the participants to progress cooperatively towards completing the objective. Input from one of the participants of the learning activity is received. The input represents an action taken in response to the exchanged messages. The content displayed to the participants is dynamically updated based on the action taken by one of the participants during the learning activity, to depict progress towards the objective.

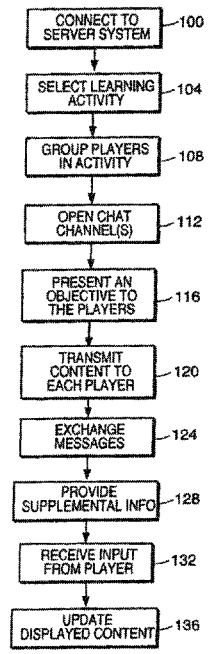

EX PARTE REEXAMINATION CERTIFICATE

NO AMENDMENTS HAVE BEEN MADE TO THE PATENT

AS A RESULT OF REEXAMINATION, IT HAS BEEN DETERMINED THAT:

The patentability of claims 1-19 is confirmed.

* * * * *